H. C. WHITE.
PIN FOR CHILDREN'S BUILDING BLOCKS.
APPLICATION FILED APR. 14, 1915.
1,142,471.
Patented June 8, 1915.
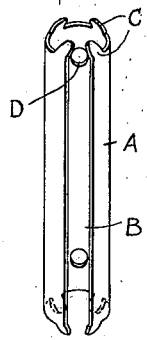
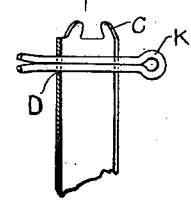
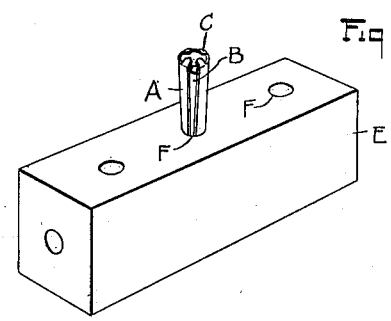
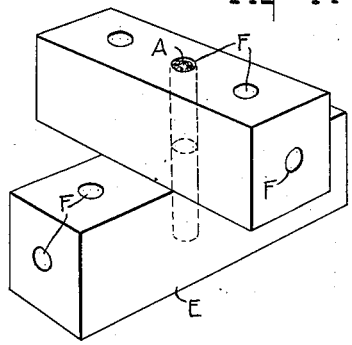

UNITED STATES PATENT OFFICE.

HARRIE C. WHITE, OF NORTH BENNINGTON, VERMONT.

PIN FOR CHILDREN'S BUILDING-BLOCKS.

1,142,471.  Specification of Letters Patent.  Patented June 8, 1915.

Application filed April 14, 1915. Serial No. 21,195.

*To all whom it may concern:*

Be it known that I, HARRIE C. WHITE, a citizen of the United States, and a resident of North Bennington, county of Bennington, and State of Vermont, have invented certain new and useful Improvements in Pins for Children's Building-Blocks, of which the following is a specification.

This invention relates to building blocks for children, more particularly to means for securing said building blocks together, and the objects of the invention are to construct a pin that is easily inserted in holes made in children's blocks, the pin being so constructed that it will adjust itself to fit holes, that vary slightly in diameter, in various blocks so as to hold them together.

Further objects of the invention are to construct the pin that it will fit and securely hold together blocks having holes of slightly different sizes.

To the accomplishment of the above objects and to such others as may hereinafter appear, the invention comprises a pin made of spring sheet metal formed in the shape of a cylinder and provided with a longitudinal slot throughout its entire length, the ends of said pin being pointed by having a series of lugs bent inward to facilitate the pin being inserted in holes in said building blocks.

Figure 1 is a perspective view on an enlarged scale showing a pin made in accordance with the invention. Fig. 2 is a sectional view through the pin shown in Fig. 1, showing a cotter pin passing through the longitudinal slot and the hole in the side of the pin. Fig. 3 is a perspective view of a building block showing a pin made in accordance with the invention inserted in a hole in said block. Fig. 4 is a view similar to Fig. 3 showing another block secured in position by the pin shown in Fig. 3.

Referring to the drawings, A designates the improved pin which, in the present instance, is preferably made of relatively thin metal formed as shown in Fig. 1, in the shape of a cylinder, and provided with a longitudinal slot B. The ends of the pin A are, in the present instance, made pointed by bending inward a series of lugs C preferably made integral with the body of the pin as shown in Fig. 1.

If the ends of the pin A were made pointed by crimping or spinning the ends of the pin, it would be found that this bending over of the entire end of the pin would so stiffen the pin as to greatly impair its spring action, making it difficult to insert the pin into a building block or to get it out. If on the other hand the pin was made of comparatively thick metal and the ends pointed by turning, or cutting away the metal, the pin would be too rigid or stiff throughout its length for satisfactory use. When, however, a series of lugs C are provided the intervening spaces between the lugs obviates any stiffening of the pin when the lugs C are bent inward to point the pin as shown in Fig. 1.

In the drawings each end of the pin A is shown provided with four lugs C although more or less lugs can be made as desired provided suitable slots are left between the lugs to obviate undue stiffening of the pin when the lugs are bent inward. The bending inward of the lugs C sufficiently points the ends of the pin so that when one end of the pin has been inserted in a block as shown in Fig. 3, so as to enlarge the free end of the pin, the bent lugs on the free end of the pin will guide the pin into the hole of another block when the other block is pressed into position as shown in Fig. 4.

If the pin A was not provided with a pointed end when the same is in the position shown in Fig. 3, it would be necessary to squeeze the top of the pin together before it could be inserted into a hole in another block. As the pin A is not very long the portion of the pin exposed in Fig. 3 is still shorter making it practically impossible to squeeze the top of the pin with the fingers and at the same time place the end of the pin in a hole in another block. The free end of the pin A could be squeezed together with a suitable tool but such a tool would be troublesome to use and practically out of the question for the use of children. The provision of the lugs C permits of the pin being made of relatively thin spring metal the spring of which is not affected to any apparent extent when the lugs C are bent inward to point the pin. The pin A is preferably provided with one or more holes D, in the present instance shown near each end of the pin, into which a button hook or similar bent tool can be inserted on the inside of the pin to withdraw the same from a hole in a building block. The hole D is preferably placed directly opposite the slot B to permit of a cotter pin K being inserted in the end of the pin as shown in Fig. 2 to prevent the pin A being withdrawn from a building block in which it has been inserted.

The pin A, as above described, is adapted to be used to join together relatively small building blocks, E, usually made of wood and provided with a series of holes F as shown in Figs. 3 and 4. The holes F are usually bored at certain fixed intervals in the blocks E, so that when the blocks are piled one upon the other the holes register and facilitate the same being held together by means of pins A, the outside circumference of which are slightly larger than the holes F.

A set of building blocks for children similar to the blocks E are made in a great variety of shapes and sizes, it being customary to make each block a multiple of a certain fixed standard block, such as the block E, so that all the blocks of the set can be attached to one another to form a great variety of combinations.

It has formerly been the custom to provide wooden pins for connecting the blocks together, but these wooden pins have not proven satisfactory for the reason that during damp weather, which is usually the time children play with these blocks, the wooden pins swell so as to make it practically impossible for a child to force the pins into or out of the holes in the blocks. In dry weather the wooden pin is also not satisfactory, as the pins shrink in size to such an extent as to not properly hold the blocks together.

While the holes in the building blocks are usually made with the greatest care, it is practically impossible to make all of the holes exactly of the same size, as many blocks are better seasoned than others, and temperature changes and weather conditions all act to vary the size of the holes.

A metal pin A made as above described, has none of the disadvantages just mentioned in reference to a wooden pin, as the metal pin A can adjust itself very easily to fit any of the holes F in the blocks E, even though these holes may vary in size quite considerably.

By referring to Fig. 3, it will be seen that a pin A, made in accordance with the invention, has been inserted in one of the holes F in the block E, the hole F, as previously stated being slightly smaller than the circumference of the pin A, so that the end of the pin A inserted in the hole F will be slightly compressed, so as to partially close the lower end of the slot B, to firmly hold the pin in position in the block. The compressing of one end of the pin A by inserting the same in a hole in one of the blocks, automatically expands the other end of the pin A as clearly shown in Fig. 3, the upper end of the slot B being wider than where the slot enters the block E. This expansion of the free end of the pin A, as just described, makes it possible to fit the free end of the pin A into a hole F that is slightly larger than the hole in which the other end of the pin is already inserted. The free end of the pin can also be easily compressed to fit a hole of the same size or smaller size as may be desired.

The pin A as made for children's blocks is not usually more than two inches long, the same being usually an inch or an inch and one half long, which is about the length of the wooden pins now used for this purpose.

The pin A as above described is very simple in construction, and far superior to wooden pins, as above pointed out, and as the pins automatically adjust themselves to holes of various sizes they are also superior to solid metal pins, or hollow unpointed pins.

I claim:

1. A pin for removably joining children's building blocks together, made of relatively thin spring metal formed in the shape of a cylinder, and provided with a longitudinal slot, and inwardly turned lugs on said pin for pointing the end thereof.

2. A pin for removably joining children's building blocks together, made of relatively thin spring metal formed in the shape of a cylinder, and provided with a longitudinal slot throughout its entire length, and inwardly turned lugs made integral with said pin for pointing the end thereof.

3. A pin for removably joining children's building blocks together, made of relatively thin spring metal formed in the shape of a cylinder, and provided with a longitudinal slot throughout its entire length and inwardly turned lugs made integral with said pin for pointing the end thereof and a hole in said pin directly opposite said longitudinal slot.

In testimony whereof I have signed this specification in the presence of two subscribing witnesses.

HARRIE C. WHITE.

Witnesses:
P. B. WEIR,
K. O. ESTES.